United States Patent
Ji et al.

(10) Patent No.: US 10,216,793 B2
(45) Date of Patent: Feb. 26, 2019

(54) OPTIMIZATION OF CONTINUOUS QUERIES IN HYBRID DATABASE AND STREAM PROCESSING SYSTEMS

(71) Applicant: SAP SE, Walldorf (DE)

(72) Inventors: Yuanzhen Ji, Dresden (DE); Zbigniew Jerzak, Berlin (DE); Anisoara Nica, Waterloo (CA); Gregor Hackenbroich, Dresden (DE)

(73) Assignee: SAP SE, Walldorf (DE)

( * ) Notice: Subject to any disclaimer, the term of this patent is extended or adjusted under 35 U.S.C. 154(b) by 648 days.

(21) Appl. No.: 14/931,005

(22) Filed: Nov. 3, 2015

(65) Prior Publication Data

US 2017/0124151 A1    May 4, 2017

(51) Int. Cl.
*G06F 17/30* (2006.01)

(52) U.S. Cl.
CPC .. *G06F 17/30463* (2013.01); *G06F 17/30516* (2013.01)

(58) Field of Classification Search
CPC ............... G06F 17/30463; G06F 17/30516
See application file for complete search history.

(56) References Cited

U.S. PATENT DOCUMENTS

| | | |
|---|---|---|
| 7,616,642 B2 | 11/2009 | Anke et al. |
| 7,616,960 B2 | 11/2009 | Anke et al. |
| 7,676,522 B2 | 3/2010 | Klein et al. |
| 7,676,523 B2 | 3/2010 | Klein et al. |
| 8,346,819 B2 | 1/2013 | Do et al. |
| 9,002,822 B2 | 4/2015 | Jerzak et al. |
| 9,002,823 B2 | 4/2015 | Jerzak et al. |
| 9,007,208 B2 | 4/2015 | Jerzak et al. |
| 2013/0346390 A1* | 12/2013 | Jerzak ............... G06F 17/30103 707/719 |
| 2014/0059109 A1* | 2/2014 | Jugel ..................... G06F 9/5027 709/201 |
| 2014/0156632 A1* | 6/2014 | Yu ..................... G06F 17/30469 707/713 |
| 2015/0248462 A1* | 9/2015 | Theeten ........... G06F 17/30516 707/688 |

OTHER PUBLICATIONS

English Version—BTW-2015 in Hamburg; 2 pages; from http://www.btw-2015.de/?startseite, last visited Jul. 22, 2015.

* cited by examiner

*Primary Examiner* — Kris E Mackes
(74) *Attorney, Agent, or Firm* — Fish & Richardson P.C.

(57) ABSTRACT

The present disclosure involves systems, software, and computer implemented methods for optimizing continuous queries for hybrid execution over a stream processing engine and an in-memory database. In one example, a method may include identifying a continuous query executed at a stream processing engine, the continuous query including a plurality of operators. An optimal plan for execution of the identified continuous query at the stream processing engine is determined. For each of the plurality of operators in the determined optimal plan, an optimized placement decision for executing a particular operator in the stream processing engine or at a database system is determined. An optimized continuous query is generated from the identified continuous query based on the determined optimal placement decisions for each of the plurality of operators in the determined optimal plan. The optimized continuous query is then executed at the stream processing engine and the database system.

19 Claims, 8 Drawing Sheets

|  | 2-way join | 5-way join | 8-way join |
|---|---|---|---|
| Opt. time of Phase-One (ms) | 0.9 | 68.5 | 100.5 |
| #R2R op. in Phase-One produced logical plan | 6 | 15 | 24 |
| #plans examined in Phase-Two w/o pruning | 64 | 327168 | 16777216 |
| #plans examined in Phase-Two with pruning | 11 | 312 | 8411 |
| Opt. time of Phase-Two with pruning (ms) | 12.3 | 908.6 | 61335.5 |
| Total opt. time (ms) | 13.2 | 977.1 | 61436 |

FIG. 5A

|  | CQ1 | CQ2 | CQ3 | CQ4 | CQ5 | CQ6 |
|---|---|---|---|---|---|---|
| Opt. time of Phase-One (ms) | 1.3 | 1.3 | 0.87 | 0.86 | 22.5 | 5.2 |
| Opt. time of Phase-Two with pruning (ms) | 7.7 | 7.5 | 11.4 | 10.8 | 1.3 | 58.9 |
| Total opt. time (ms) | 9 | 8.8 | 12.27 | 11.66 | 23.8 | 64.1 |

FIG. 5B

OPTIMIZATION OF CONTINUOUS QUERIES IN HYBRID DATABASE AND STREAM PROCESSING SYSTEMS

TECHNICAL FIELD

The present disclosure relates to computer systems and computer-implemented methods for optimizing continuous queries for hybrid execution over a stream processing engine and a database.

Event stream processing, or ESP, is a set of technologies designed to assist the construction of event-driven information systems. ESP technologies include event visualization, event databases, event-driven middleware, and event processing languages, or complex event processing (CEP). ESP deals with the task of processing streams of event data with the goal of identifying the meaningful pattern within those streams, employing techniques such as detection of relationships between multiple events, event correlation, event hierarchies, and other aspects such as causality, membership and timing. In many instances, continuous queries associated with the incoming event stream may be performed at an event stream processor, allowing for real-time queries on incoming data. ESP enables many different applications such as algorithmic trading in financial services, RFID event processing applications, fraud detection, process monitoring, and location-based services in telecommunications.

SUMMARY

The present disclosure involves systems, software, and computer-implemented methods for optimizing continuous queries for hybrid execution over a stream processing engine and a database. In one example, a method may include identifying a continuous query executed at a stream processing engine, the continuous query including a plurality of operators. An optimal plan for execution of the identified continuous query at the stream processing engine is determined. For each of the plurality of operators in the determined optimal plan, an optimized placement decision for executing a particular operator in the stream processing engine or at a database system is determined. An optimized continuous query is generated from the identified continuous query based on the determined optimal placement decisions for each of the plurality of operators in the determined optimal plan. The optimized continuous query is then executed at the stream processing engine and the database system.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 5A and 5B illustrate an example set of optimization results.

DETAILED DESCRIPTION

Figure 1:
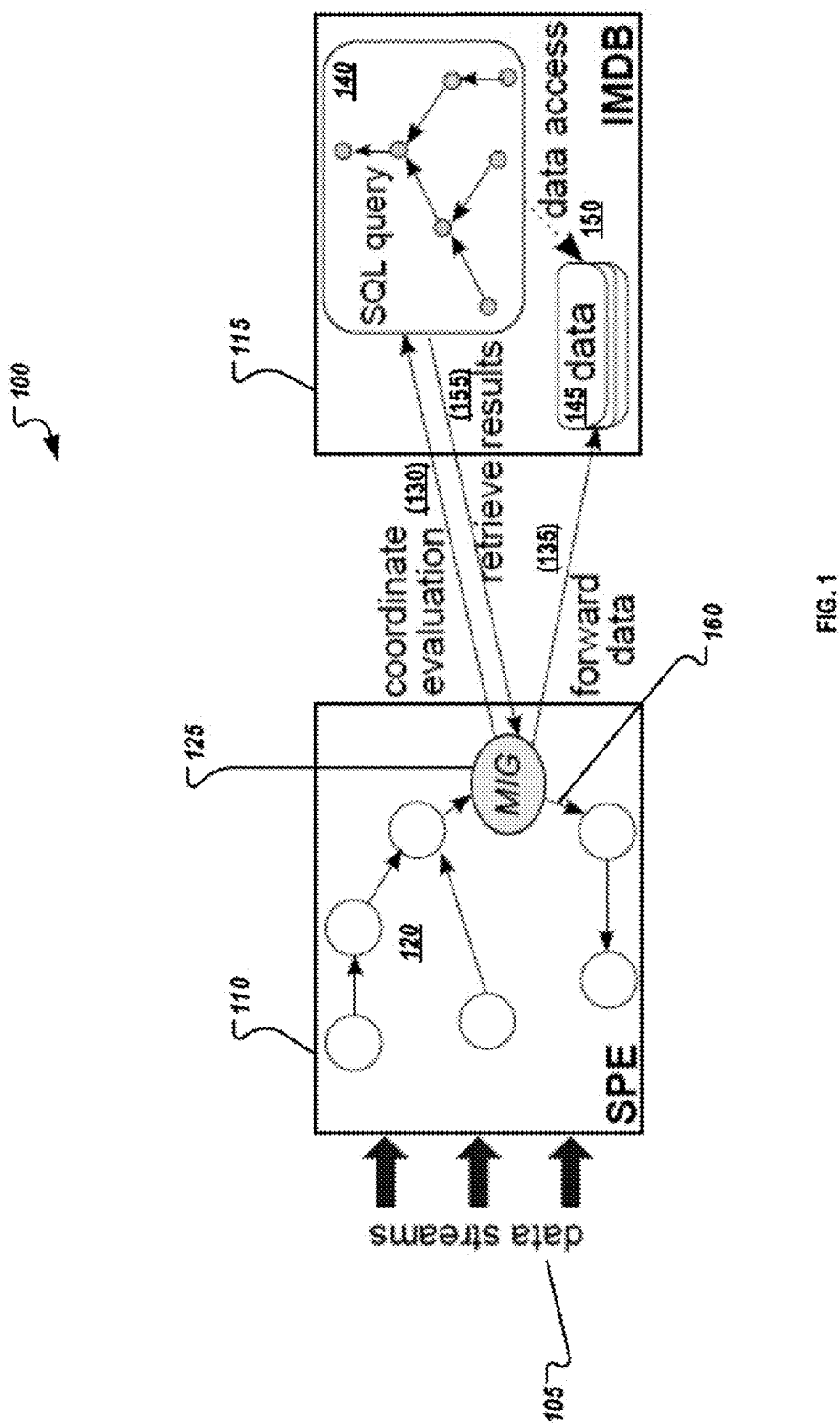
FIG. 1 is an example illustration of execution of a continuous query across a hybrid query system.

The present disclosure describes example systems and methods for optimizing continuous queries for hybrid execution over a stream processing engine and a database. The constantly increasing number of connected devices and sensors results in increasing volume and velocity of sensor-based streaming data. Traditional approaches for processing high velocity sensor data rely on stream processing engines (SPEs), usually via a continuous query. Continuous queries are issued once and are executed constantly over the data streams, returning a continuous stream of query results. However, the increasing complexity of continuous queries executed on top of high velocity data has resulted in growing demand for hybrid systems composed of data stream processing engines and database engines. One of major challenges for such systems is to devise the optimal query execution plan to maximize the throughput of continuous queries. The present solution provides a general framework for hybrid database and stream processing systems, and introduces the design and implementation of a cost-based optimizer for optimizing relational continuous queries in such systems. The described optimizer uses characteristics of continuous queries and source data streams to devise an optimal placement for each operator of a continuous query. This fine level of optimization, combined with the estimation of the feasibility of query plans, allows the optimizer to devise query plans which result in 8 times higher throughput as compared to the baseline approach which uses only stream processing engines. For even simple queries, results have shown that a hybrid execution plan can result in 4 times and 1.6 times higher throughput than a pure stream processing engine plan and a pure database engine plan, respectively.

Existing SPEs are built either from scratch or on top of existing database systems. Despite this fact, the SPEs show limitations in processing certain types of complex continuous queries when compared to modern databases, such as in-memory column stores. In addition, before introducing SPEs, most of today's enterprises already have database systems in place for data persistence and on-demand analytical processing. Hence, the co-existence of a SPE and a DBMS can be found in many real-world setups. The present solution introduces a hybrid solution of the SPE and the database engine for joint execution of continuous queries to achieve performance which cannot be matched by either engine alone. In creating a hybrid execution between the systems, certain fragments of a continuous query can be outsourced from the SPE to the database engine when the outsourcing can lead to better performance. It is noted, however, that the hybrid system may be able to support continuous queries that access both streaming data and stored data.

One major challenge of such systems is to find the optimal execution plan for a given continuous query. Existing database and stream processing systems either have no hybrid optimizer at all, or choose the most suitable system for execution of the entire query. Moreover, none of the existing systems consider the feasibility property of execution plans of continuous queries, where the feasibility property describes the capability of a plan to keep up with the data arrival rate. Additionally, the heterogeneity between the underlying SPE and the database engine causes the non-additivity of the query execution cost. Specifically, the non-additive execution cost means that the cost of executing two consecutive operators in the database engine is not necessarily higher than the cost of executing only the first operator in the database engine. This non-additivity makes it difficult for a query optimizer to make pruning decisions during plan enumeration. Existing solutions used in traditional database systems for handling non-additivity must therefore be extended to consider the feasibility property of plans of continuous queries.

The solution describes the design and implementation of a static cost-based optimizer for optimizing relational continuous queries in a hybrid database and stream processing engine system. To do so, the optimizer exploits the potential of distributed execution of continuous queries across a SPE engine and a database engine. Using characteristics of the particular queries and the incoming data streams, the optimizer determines an optimal placement for each operator in a continuous query, taking into account the feasibility of query plans and the non-additivity of the query execution cost caused by the hybrid execution. To reduce the search space of query plans, a two-phase optimization strategy is used. In Phase One, an optimal logical query plan is produced. In Phase Two, placement decisions for all operators in the chosen logical plan are made. The placement decisions in Phase Two are based on the study of the cost characteristics of operators placed on the two different engines, thereby reducing the search space further.

Continuous Query Semantics

Semantics related to continuous queries described herein are provided here for understanding. The abstract semantics of continuous queries are adapted based on two data types, streams and time-varying relations, and three classes of query operators. Assuming a discrete and ordered time domain T, streams and time-varying relations are defined as follows. First, a stream S is a possibly infinite bag of elements <s, τ>, where s is a tuple belonging to the schema of S and τ∈T is the timestamp of s. A time-varying relation R is a mapping from T to a finite but unbounded bag of tuple belonging to the schema of R. Time-varying relations are referred to as relations where the context of stream processing is used.

The three classes of query operators are the stream-to-relation (S2R) operators, which produce one relation from one stream; relation-to-relation (R2R) operators, which produce one relation from one or more relations; and relation-to-stream (R2S) operators, which produce one stream from a relation. The most typical S2R operator is the window operator. In the present description, a focus is placed on time-based and tuple-based sliding windows. R2R operators are straightforward counterparts of relational operators in conventional database systems. This description focuses on selection, projection, equi-join, and aggregation, although other R2R operators may be used. Without loss of generality, an assumption is made that each R2R operator has at most two input relations—a multi-way join is treated as a sequence of two-way joins. Further, semantically for sliding-window aggregations, it is understood that aggregation results are produced at each slide of the window.

Pipelined Execution

A pipelined query execution model is adopted to adapt to the push characteristic of data streams. With pipelined execution, query operators are organized into series of producer-consumer pairs that are connected via a buffering mechanism, e.g., data queues. The producer and the consumer can run in parallel, embodying the so-called pipelined parallelism. Pipelined execution allows exploiting the power of modern multiprocessor machines to accelerate data processing.

Pipelined relationships are modeled among operators in a continuous query CQ with a directed tree, denoted as T=(O; E). A node $O_i \in O$ represents a query operator and an edge $e_{ij} \in E$ represents the data flow from node $O_i$ to $O_j$. The tree representing the flow between operators is defined as a logical plan of CQ, similar to the notions used in conventional database systems. Operators in a logical plan are referred to as logical operators, where a logical plan of a continuous query may have multiple semantically equivalent alternatives.

Hybrid Continuous Query Execution

In an example system, an SPE and a columnar in-memory database (IMDB) can be used to implement the described solution. While an IMDB is described in many of the illustrations herein, any type of database, including relational databases, may be used to accomplish the hybrid execution options and benefits described herein. Determined by the semantic mapping between continuous queries and SQL queries, given a logical plan T of a query, fragments of T that can potentially be executed in the database engine are sub-trees of T that contain only R2R operators. These sub-trees of T may be called a migration candidate. A composition of several R2R operators produces one relation from one or more relations, and can be regarded as a R2R operator. Each migration candidate can be considered a composite R2R operator. When selected for execution in the IMDB, a migration candidate can be translated into a SQL query and executed in the database engine. Particularly, base relations involved in the SQL query map to the input relations of the migration candidate; the result of the SQL query maps to the output relation of the migration candidate.

FIG. 1 illustrates how a continuous query is executed across the SPE 110 and the IMDB 115 in the illustrated system 100. The SPE 110 acts as the gateway of external data streams 105, where each of the data streams 105 arrives at or are directed to the SPE 110 initially. The continuous query is illustrated as made up of a plurality of operators 120 performing a defined query based on the ordered operations of those operators 120. To execute a hybrid query, data transfer (140) between the SPE 110 and the database engine 115 is performed. Specifically, for each migration candidate (illustrated as migration wrapper, migration operator, or MIG 125) placed in the database engine 115, relevant input data from the SPE 110 is transferred (135) to the database engine 115, evaluation of a SQL query 140 executing in lieu of at least one original operator 120 from the continuous query is triggered based on an instruction to evaluate the SQL query 140, and subsequent execution results are then transferred back (155) from the database engine 115 back to the SPE 110.

To retain the original query semantics, the SQL query 140 corresponding to a migration candidate must be re-executed in response to changes in the input relations of the migration candidate. To coordinate the data transfer between the two engines and the re-execution of the corresponding SQL query 140, a new operator MIG 125 is into the SPE 110. A MIG operator 125 acts as a wrapper of a migration candidate executed in the IMDB 115. The MIG 125 controls the data transfer between the two engines and hides the execution specifics within the IMDB 115 from the SPE 110. In a parallel environment, MIG operators 125 run in parallel with other query operators 120 in the SPE 110. However, from the SPE's perspective, each migration candidate wrapped by a MIG operator 125 is a black-box, where the original pipelined relationships among operators now included in the migration candidate are no longer visible. When the query reached the MIG operator 125, the MIG operator 125 is able to coordinate evaluation (130) of a SQL query 140 executed at the IMDB 115, where the SQL query 140 represents the one or more operators from an original continuous query that are now represented by the MIG operator 125. The SQL query 140 can execute based on the input data 145 received from the MIG operator 125 (via 135), where the input data 145 received from the MIG operator 125 is stored in tables in the IMDB 115. The database then accesses (150) the stored data 145 for execution in the SQL query 140. As noted, results from the execution of the SQL query 140 are then provided back (155) to the MIG operator 125 to use as input (160) to downstream operators.

The execution plan can be represented as follows. Given a logical plan $T=(O; E)$ of a continuous query, the execution plan of T is denoted as $P(T)=(O', E', M)$. $O_i^x \in O'$ represents a physical operator in the execution plan, where $x \in \{spe, db\}$. Specifically, $O_i^{spe}$ represents a basic query operator (e.g., selection, join, etc.) placed in the SPE, and $O_i^{db}$ represents a migration candidate placed in the database engine. For ease of reference, in the remainder of this disclosure, a basic query operator placed in the SPE is referred to as a SPE-op and a composite operator representing a migration candidate placed in the database engine as a DB-op. $e'_{ij} \in E'$ represents the data flow from $O_i^x$ to $O_j^y$ ($x, y \in \{spe, db\}$). Finally, M defines a mapping from O to O'. For each $O^x \in O'$, $M(O^x)$ defines the subset of O that $O^x$ maps to. Specifically, $M(O^{spe})$ is a set containing only one logical operator; $M(O^{db})$ is a set containing one or more logical operators.

Optimization Objective

A common performance metric for a continuous query executed over data streams is the output rate of the query. Therefore, maximizing the query output rate is a widely adopted objective in continuous query optimization. Maximizing the output rate of a query is equivalent to maximizing the amount of input data processed by the query in unit time, which is defined as the query throughput. Intuitively, an execution plan reaches its maximum throughput when it can keep up with the data arrival rate. This capability of keeping up with the data arrival rate is defined as the feasibility of the plan. A continuous query is a feasible query if it has at least one feasible plan.

The optimization objective on the query throughput suggests that a query optimizer should favor feasible plans over infeasible plans for feasible queries, and should select the plan that can maximize the query throughput for infeasible queries. A determination must be made as to what to do if a query has multiple feasible plans. Given enough resources, all feasible plans of a continuous query have the same throughput. Therefore, a different optimization objective—that is, minimizing the total resource utilization of the query—is used to compare feasible plans. The less resources each query consumes, the more number of queries that a system can execute concurrently. The optimization objection performed by the optimizer is as follows:

For feasible queries, the feasible execution plan with the least resource utilization should be used.

For infeasible queries, the plan which has the maximum query throughput should be used.

Generally, given two execution plans of a continuous query, the possible situations faced by an optimizer, and the respective appropriate optimization decision are the following:

Situation 1: One plan is feasible and the other is infeasible. The feasible plan should be chosen.

Situation 2: Both plans are feasible. The plan with the less resource utilization should be chosen.

Situation 3: Both plans are infeasible. The plan with the higher throughput should be chosen.

Cost Model

To achieve the optimization objective described above, a cost-based optimizer is proposed. Without loss of generality or a limitation to the description, an example considers continuous queries whose logical plans have window operators appear only as leaf nodes and R2S operators appear only as root nodes. Note that a query with window or R2S operators appearing as internal nodes can always be split into a set of sub-queries, with the logical plan of each subquery satisfying the above condition. A highly parallel environment with abundant memory is assumed for query execution. Hence, operators are fully pipelined and do not time-share CPU resources.

Additionally, it is assumed that data from source streams arrive at a relatively stable rate. The data rate $\lambda_{S_i}$ of each source stream $S_i$ in a plan P defines how much data from $S_i$ should be processed by P within unit time. The data arrived from all source streams in a plan within unit time is referred to as the unit-time source arrivals. The amount of data that an operator produces as a result of the unit-time source arrivals is defined as the source-driven output-size of the operator, denoted by $\lambda_{out}$. It is noted that (1) the source-driven output-size of an operator is the amount of data produced by the operator as a result of unit-time source-arrivals, but is not the amount of data generated by the operator within unit time, which is also known as the output rate; (2) the source-driven output-size of an operator $O_i$ is used as the source-driven input-size (denoted by $\lambda_{in}$) by its direct downstream operator $O_j$ to estimate the source-driven output-size of $O_j$.

Given data rates of all source streams involved in a query, the source-driven output-size $\lambda_{out}$ of each operator can be estimated in a bottom-up way. A $\lambda_{out}$ of window-based selection, projection, and join are calculated. Specifically, for a selection or a projection with selectivity f its source-driven output-size is $\lambda_{out}=f\lambda_{in}$. For a join operator, supposing that the size of its left input relation is $W_L$, the size of the right input relation is $W_R$, and the selectivities relative to the left and the right relations are $f_L$ and $f_R$, respectively. The size of a relation is defined as the number of tuples contained in the relation. The source-driven output-size can be estimated as $\lambda_{out}=\lambda_{in_L}f_R W_R + \lambda_{in_R}f_L W_L$, For a time-based sliding window, if the slide size is $\beta$ time units, then on average the unit-time sliding frequency, denoted as l, is $1/\beta$. For a tuple-based sliding window whose slide size is $\beta$ tuples, the sliding frequency depends on the data rate of the source stream as well, and is estimated as $l=\lambda_s/\beta$. Suppose that the average number of result groups, as determined by the associated grouping predicate of the aggregate operator, is g. The source-driven output-size of an aggregate operator can be estimated as $\lambda_{out}=$lg.

After introducing the estimation of source-driven input/output sizes of operators, the estimated costs of physical operators in an execution plan are to be generated. Each tuple arriving at an operator requires some processing effort from the operator. The average time that an operator $O_j^x$ requires to process a single tuple from a direct upstream operator $O_i^x$ is referred to as the unit processing cost of $O_j^x$ for $O_i^x$, denoted by $c_{ji}$, or simply $c_j$ if $O_j^x$ has only one upstream operator. For an operator $O_j^x$ with k upstream operators, the total cost of $O_j^x$ caused by unit-time source-arrivals is defined as the source-driven input processing cost, denoted by $u_j$. The value $u_j$ is estimated as:

$$u_j = \sum_{i=1}^{k} \lambda_i c_{ji}$$

To keep up with the data arrival rate, the time needed to process a single tuple by each operator in a pipeline must be shorter than the average data arrival interval at the operator. In other words, the constraint of $\Sigma_{i=1}^{k}\lambda_i c_{ji} \leq 1$, namely $u_j \leq 1$, must hold. An operator that cannot meet this constraint is a bottleneck of the pipeline.

The cost estimation method described above can be used directly to estimate costs of SPE-ops in an execution plan. The unit processing cost c of a specific SPE-op depends on the type and the physical implementation of the operator.

In contrast to a SPE-op, which maps to a single logical operator, a DB-op maps to one or more logical operators and is evaluated as one single SQL query. Hence, the unit processing cost of a DB-op is the execution cost of the corresponding SQL query. Moreover, each time when a DB-op is executed, the relevant input data from the SPE is transferred to the database, with the execution results then transferred back to the SPE from the database. The costs of inter-engine data transfer is therefore taken into account as well. In summary, the unit processing cost of a DB-op consists of three parts: the cost of transferring relevant input data from the SPE to the database, the cost of evaluating the SQL query, and the cost of transferring the SQL query results back to the SPE. The cost model of DB-ops can be estimated for in-memory database systems.

Turning to estimating costs of execution plans, the cost of an execution plan P with m operators is denoted by C(P) as a two dimensional vector consisting of two cost metrics: a bottleneck cost $C_b(P)$ and a total utilization cost $C_u(P)$, namely, $C(P)=\langle C_b(P), C_u(P)\rangle$. $C_b(P)$ and $C_u(P)$ are computed as follows:

$$C_b(P) = \max\{u_j^x : j \in [1, m]\}$$

$$C_u(P) = \sum_{j=1}^{m} u_j^x$$

Here the "bottleneck" refers to the operator with the highest source-driven input processing cost in the plan. The bottleneck cost is used to check the feasibility of a plan. Moreover, for infeasible plans of a query, a higher bottleneck cost implies that the plan can handle fewer input data per unit time; therefore, the bottleneck cost can also be used as an indicator of the throughput of an infeasible plan. The total utilization cost estimates the total amount of resources required by the plan to process unit-time source arrivals.

Based on the above cost metrics for execution plans, the optimal plan of a given continuous query is defined as follows:

Definition 1. For a continuous query CQ, an execution plan P is an optimal plan of CQ, if and only if for any other plan P' of CQ, one of the following conditions is satisfied:
Condition 1°: $C_b(P) \leq 1 \leq C_b(P')$.
Condition 2°: $C_b(P) \leq 1$, $C_b(P') \leq 1$, and $C_u(P) \leq C_u(P')$.
Condition 3°: $1 < C_b(P) \leq C_b(P')$.

Each condition in Definition 1 applies to a specific situation. Condition 1° is applied when P is feasible and P' is infeasible, Condition 2° is applied when both P and P' are feasible, and Condition 3° is applied when both P and P' are infeasible.

Two-Phase Optimization

In principle, a R2R operator of a query can be executed either in the SPE or in the database engine. However, the placement decision for the operator does not influence its pipelined relationships with its upstream and downstream operators. Consequently, the options of the execution engine for an operator can be treated as physical implementation alternatives of the operator, thereby allows integrating the selection of the execution engine for operators into the physical plan enumeration phase of a query optimizer.

A continuous query could have a large number of semantically equivalent logical plans due to, for instance, different join ordering possibilities. Even for an individual logical plan T with n R2R operators, there are in total $2^n$ possible execution plans for T. Due to the large search space of execution plans, exhaustive searches for the optimal plan are too expensive. To remove this issue, a two-phase optimization approach is used. Specifically, the optimization process is divided into Phase One, which determines the optimal logical plan for a given query, which considers the join ordering and the push-down/up of aggregates, and Phase Two, which determines the execution engines of operators in the logical plan picked in Phase One.

In one example implementation, a System R style dynamic programming optimizer may be used. This optimizer relies on the principle of optimality to prune away expensive plans as early as possible. To be able to use this approach, it can be shown that the principle of optimality holds in the context of continuous query optimization as well, namely, the optimal plan for joining a set of k streams $S=\{S_1, S_2, \ldots S_k\}$ with another stream $S_{k+1}$ can be obtained by joining stream $S_{k+1}$ with the optimal plan that joins all streams in S.

Figure 2:
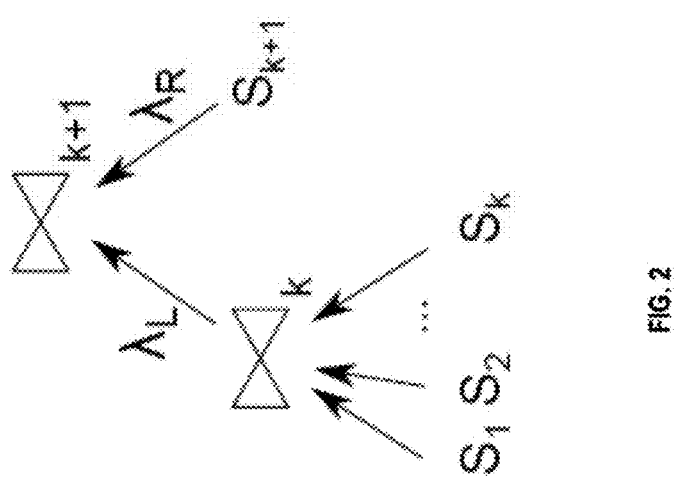
FIG. 2 illustrates an example join query and its operators.

FIG. 2 illustrates an example join query. Window operators are skipped in the figure for brevity, although actual implementations will still include the window operators. The optimal plan for joining the set of streams $S=\{S_1, S_2, \ldots S_k\}$ is denoted as $P_{opt}$. Any suboptimal plan is denoted as $P_s$. For the example, suppose that the next stream to be joined is $S_{k+1}$, which incurs $\lambda_R$ unit-time source-driven arrivals at the new join operator (denoted as $\bowtie_{k+1}$). It is noted that the total number of join results produced by $P_{opt}$ as a result of unit-time arrivals from all streams in S is the same as that produced by $P_s$. Namely, the source-driven output-sizes of $\bowtie_k$ are identical in all plans that join streams in S. Therefore, it can be inferred that the source-driven input processing cost u of $\bowtie_{k+1}$ is the same in all plans extended from plans for $\bowtie_k$. Denoting the plan extended from $P_{opt}$ to join with $S_{k+1}$ as $P'_{opt}$, and the plan extended from $P_s$ to join with $S_{k+1}$ as $P'_s$, it can be proved that $P'_{opt}$ is still optimal compared to $P'_s$. Specifically, the proof below address where $P_{opt}$ is feasible and non-feasible.

The first case, i.e. Case 1, is where $P_{opt}$ is feasible. In this case, a plan $P_s$ is suboptimal either because it is infeasible (Condition 1° above), or because it is feasible as well but has a higher total utilization cost (Condition 2°). In Case 1.1, if $P_s$ is infeasible, then the plan $P'_s$ extended from $P_s$ with $\bowtie_{k+1}$ is still infeasible. Extending $P_{opt}$ with $\bowtie_{k+1}$ can either leave the resulting plan $P'_{opt}$ feasible if $u \le 1$, or make $P'_{opt}$ infeasible if $u > 1$. In the former case, it is obvious that $P'_{opt}$ is better than $P'_s$. In the later case, the bottleneck cost of $P'_{opt}$ and $P'_s$ are compared. $C_b(P'_{opt})$ now equals u. $C_b(P'_s)$ equals $C_b(P_s)$ if $u < C_b(P_s)$, or u if $u \ge C_b(P_s)$. In either case, $1 \le C_b(P'_{opt}) \le C_b(P'_s)$. Therefore, $P'_{opt}$ is still optimal (Condition 3°).

In Case 1.2, if $P_s$ is feasible but has a higher total utilization cost than $P_{opt}$, then the feasibility of $P'_{opt}$ and $P'_s$ is determined by u in the same way. Specifically, if $u \le 1$, then both $P'_{opt}$ and $P'_s$ are feasible. Moreover, $C_u(P'_s)$ is higher than $C_u(P'_{opt})$, because $C_u(P'_s) = C_u(P_s) + u$, $C_u(P'_{opt}) = C_u(P_{opt}) + u$, and $C_u(P'_s) > C_u(P'_{opt})$. Therefore, $P'_{opt}$ is optimal compared to $P'_s$ according to Condition 1°. If $u > 1$, then both $P'_{opt}$ and $P'_s$ are infeasible, and $C_b(P'_{opt}) = C_b(P'_s) = u > 1$. Therefore, $P'_{opt}$ is still optimal according to Condition 3°.

In the second case, i.e., Case 2, $P_{opt}$ is infeasible. In this case, $P_s$ can be suboptimal only when $P_s$ is infeasible and $1 < C_b(P_{opt}) < C_b(P_s)$ (Condition 3°). Plans extended from infeasible plans remain infeasible. Therefore, both $P'_{opt}$ and $P'_s$ are infeasible. Depending on the value of u, the relationship between $C_b(P'_{opt})$ and $C_b(P'_s)$ is one of the following cases:

If $u < C_b(P_{opt}) < C_b(P_s)$, then $C_b(P'_{opt}) = C_b(P_{opt}) \le C_b(P'_s) = C_b(P_s)$.

If $C_b(P_{opt}) \le u < C_b(P_s)$, then $C_b(P'_{opt}) = u < C_b(P'_s) = C_b(P_s)$.

If $C_b(P_{opt}) \le C_b(P_s) \le u$, then $C_b(P'_{opt}) = C_b(P'_s) = u$.

It is observed that $1 < C_b(P'_{opt}) \le C_b(P'_s)$ (that is, Condition 3°) holds in all three cases. Hence, $P'_{opt}$ is still optimal.

The above proof shows that the key reasons for the applicability of the principle of optimality are: (1) the source-driven input processing cost u of the new join operator $\bowtie_{k+1}$ is the same in all plans extended from a possible plan that joins streams $S_1, S_2, \ldots S_k$; and (2) u of $\bowtie_{k+1}$ does not change when extending $\bowtie_{k+1}$ to join with other streams.

Pruning in Phase Two

Taking the plan produced in Phase One as an optimal logical plan, the optimizer determines in Phase Two the execution engine for each operator in the plan in a bottom-up way. In this section, the pruning strategy used by an example optimizer in Phase Two is described to further reduce the search space and prove the validity of the pruning strategy.

By studying the characteristics of the cost of individual SPE-ops and DB-ops, as well as the influence of their costs on the cost of the entire execution plan, the following properties of SPE-ops have been observed: (1) the source-driven input processing cost u of a SPE-op $O^{spe}$ is identical in all partial plans rooted at $O^{spe}$; (2) the source-driven input processing cost of $O^{spe}$ in a partial plan P rooted at $O^{spe}$ is not changed when P is further extended. In fact, these two properties are similar to that of the join operators in FIG. 2, which suggests that a similar principle of optimality is applicable for pruning the search space. Specifically, to obtain an optimal (partial) plan rooted at a SPE-op $O^{spe}$, it suffices to consider only the optimal partial plans rooted at the direct upstream operators of $O^{spe}$.

Figure 3C:
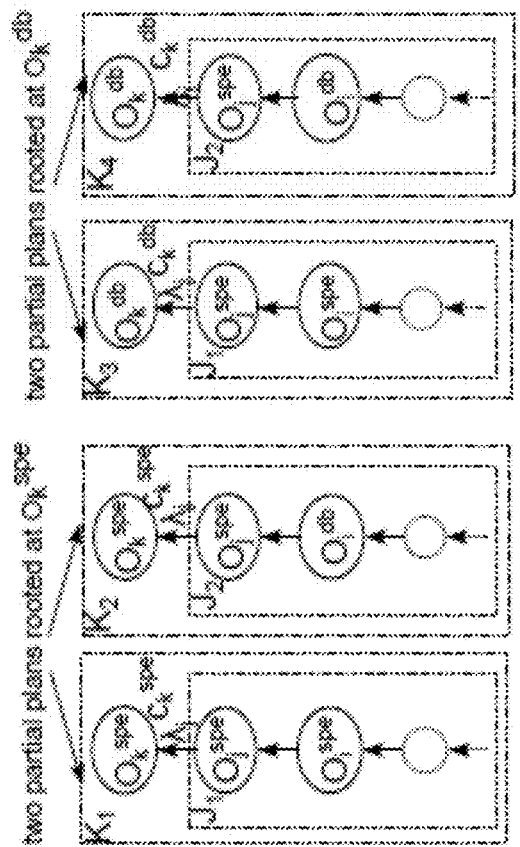
FIGS. 3A-C illustrate an example set of optimal query plans and comparisons.
Figure 3B:
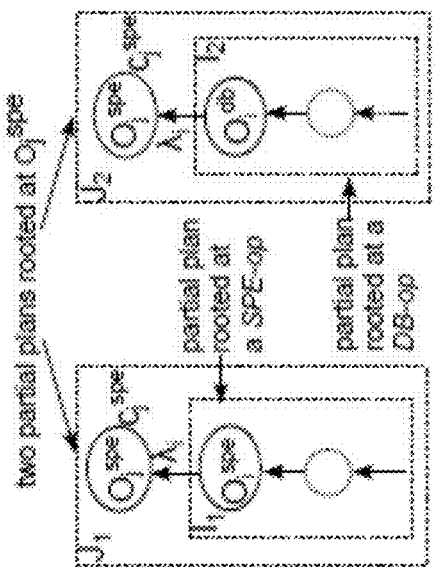
Figure 3A:
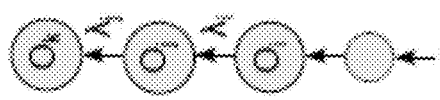

A logical plan is considered in FIGS. 3A-C. Suppose that the current logical operator being enumerated is $O_j$. As a bottom-up enumeration approach is adopted, the enumeration for $O_i$ will be completed. Further, suppose that in total, two partial plans are obtained until $O_i$, denoted by $I_1$ and $I_2$ in FIG. 3B. $I_1$ is rooted at a SPE-op and $I_2$ is rooted at a DB-op. If no pruning is considered, two SPE-op rooted partial plans until $O_j$ can be constructed: one plan extends $I_1$, denoted by A, and the other plan extends $I_2$, denoted by h. The proof below indicates that only one SPE-op rooted partial plan until $O_j$ needs to be constructed based on the optimal partial plan between $I_1$ and $I_2$.

The proof consists of two parts. In the first part it is shown that the optimality relationship between $J_1$ and $J_2$ is the same as that between $I_1$ and $I_2$. In the second part, it is shown that for any pair of complete plans $P_1$ and $P_2$, the optimality relationship between $P_1$ and $P_2$ is the same as that between $I_1$ and $I_2$, if $P_1$ and $P_2$ differ from each other only by the partial plans until $O_j$ in the way that the partial plan in $P_1$ is $J_1$ and in $P_2$ is $J_2$.

First, it is shown that $J_1$ is better than $J_2$ if $I_1$ is better than $I_2$. According to Definition 1 above, there are three possible situations where $I_1$ can be better than $I_2$. For each situation, the proof to show that $J_1$ is better than $J_2$ is similar to the proof for each of the specific cases (i.e., Case 1.1, Case 1.2, and Case 2) described above. References to the corresponding cases of the prior proof are reproduced here:

Situation 1: $C_b(I_1) \le 1 \le C_b(I_2)$, i.e., $I_1$ is feasible whereas $I_2$ is infeasible. The proof is similar to that for Case 1.1.

Situation 2: $C_b(I_1) \le 1$, $C_b(I_2) \le 1$, and $C_u(I_1) \le C_u(I_2)$, i.e., both $I_1$ and $I_2$ are feasible. The proof is similar to that for Case 1.2.

Situation 3: $1 < C_b(I_1) \le C_b(I_2)$, i.e., both $I_1$ and $I_2$ are infeasible. The proof is similar to that for Case 2.

The symmetric case that $J_2$ is better than $J_1$ if $I_2$ is better than $I_1$ can be proved in the same way. Moreover, the proof can be extended to show that for an operator $O_j$ with multiple direct upstream operators, the optimal SPE-op rooted partial plan until $O_j$ can be constructed from the respective optimal partial plans until each direct upstream operator of $O_j$.

In the second part, it is shown that for a pair of complete plans which are constructed as extensions of $J_1$ and $J_2$ respectively, if they differ from each other only by the partial plan $J_1$ and $J_2$, then the optimality relationship between them is the same as that between $J_1$ and $J_2$. Strictly, the optimality needs to be shown to be retained along the plan construction procedure until the root node of the logical plan. However, if it can be proved for the direct downstream operator of $O_j$, which is $O_k$ in FIG. 3A, that no matter in which engine $O_k$ is placed, the optimality relationship between the partial plans extended from $J_1$ and $J_2$ is the same as the optimality relationship between $J_1$ and $J_2$, then the same reasoning can be applied recursively. Therefore, in the following, it is only shown that for the two partial plan pairs ($K_1$, $K_2$) and ($K_3$, $K_4$) in FIG. 3C, the optimality within each pair is the same as that between $J_1$ and $J_2$, and is therefore the same as that between $J_1$ and $J_2$.

For the pair ($K_1$, $K_2$) where $O_k$ is assigned to the SPE, the same proof as described above can be applied. The proof for the pair ($K_3$, $K_4$) is similar. It is noted that in the partial plans $K_3$ and $K_4$, $O_k$ is placed in the database engine, and the source-driven input processing cost u of $O_k^{db}$ is $\lambda_j c_k^{db}$. If the downstream operator of $O_k$ in $K_3$ and $K_4$ is placed in the database engine as well, then the two resulting plans, say $K'_3$ and $K'_4$, have a composite operator $O_k^{db}$. The source-driven input processing cost u' of $O_k^{db}$ is $\lambda_j c_k^{db}$. Although u' is different from u, u' is the same for both $K'_3$ and $K'_4$ and therefore does not influence the optimality relationship between $K'_3$ and $K'_4$.

With the above described pruning strategy, for a logical plan with n R2R operators, we get only one SPE-op rooted complete execution plan, all the other plans are rooted at a DB-op. For logical plans containing only unary operators, the search space size can be reduced from $2^n$ to n+1. For logical plans containing also binary operators, the search space size depends heavily on the number of binary operators in the tree, because when constructing a DB-op-rooted plan at a binary operator, all possibilities of combining partial plans rooted at the left child of the operator with partial plans rooted at the right child of the operator must be considered. In the worst case where all n R2R operators in the plan are binary operators, the logical plan is a complete binary tree. Ignoring window operators at leaf nodes, the height of the tree is $h=\log_2(n+1)$. Given the height of a binary tree, the upper bound of the search space size can be defined as a function of h in a recursive way, as $f(1)=2$; $f(h)=1+f(h-1)^2$. The complexity of f(h) is $O(f(h))=2^{2^{h-1}}$. By replacing h with $[\log_2(n+1)]$, O(f(h)) is approximately $$2^{\frac{n}{2}},$$

which is exponential. To be able to optimize queries with a large number of binary R2R operators with reasonable time, one solution is to decompose the logical plan produced in Phase One into multiple subplans, each with a moderate number of binary operators, optimize these subplans in their post order, and construct the final execution plan by combining optimal execution plans of the subplans.

Example results using the described continuous query optimizer and hybrid query execution has been evaluated from three aspects: the optimization time, the quality of optimization results, and the influence of the plan feasibility check on the quality of the optimization result. An example system implemented for testing by extending an SQL optimizer of an in-memory database. In the example system, the cost estimation for SPE-ops was added, allowing the in-memory database optimizer to compare the estimated costs of the DB-ops to those of the corresponding SPE-ops. It should be noted and considered that the query optimizer component evaluating the relative costs associated with SPE-ops and DB-ops may be executed in any suitable location, including at either the stream processing engine or the in-memory database, as well as remote from both components.

In an illustrated example, energy consumption data originating from smart plugs deployed in households is used. In the example, each smart plug is uniquely identified by a combination of a house id, a household id, and a plug id. Each plug has two sensors. One sensor measures the instant power consumption with Watt as unit; the other sensor measures the total accumulated power consumption since the start (or reset) of the sensor with kWh as unit. Each measurement is represented as a relational tuple. The type of the measurement is indicated by the property field in the tuple. Sensors report measurements every 1 second and measurements from all smart plugs are merged into a single data stream. The original rate of this sensor data stream is approximately 2000 tuples/sec. To test with higher data rates, the original sensor data was replayed at a configurable speed, allowing simulation of a higher report frequency of smart plugs.

Figure 4:
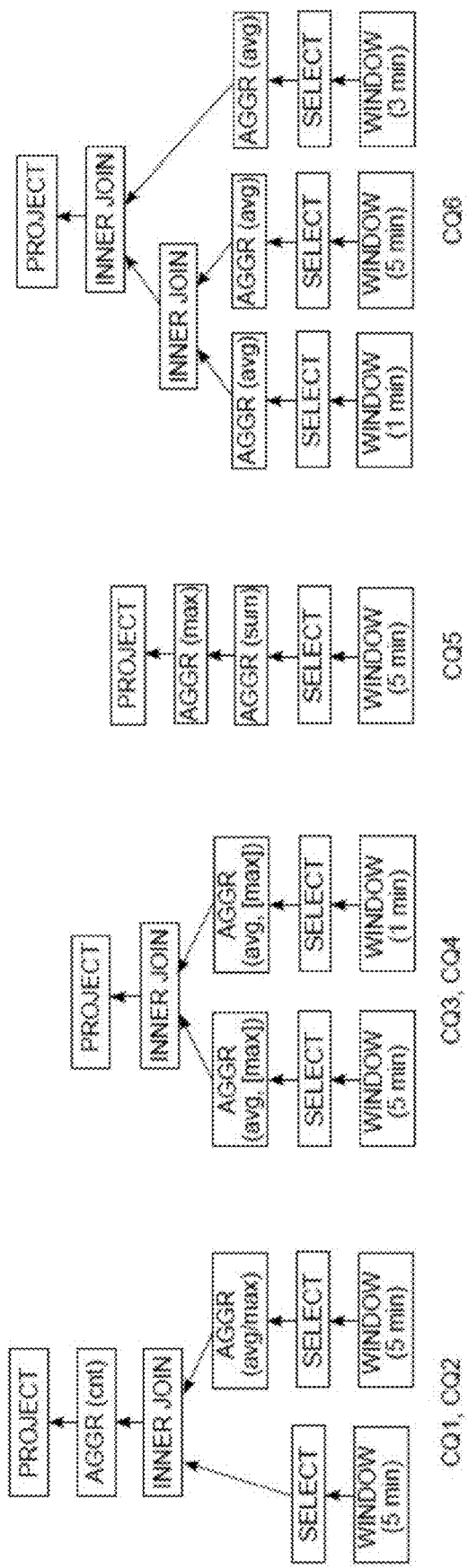
FIG. 4 illustrates a plurality of potential queries including multiple operators for optimization in the described systems.

Multiple continuous queries were tested using the hybrid optimizer. The logical plans of six example continuous queries are illustrated in FIG. 4, and represent the following continuous queries:

CQ1: For each smart plug, count the number of load measurements in the last 5 minutes whose value is higher than 90% of the maximum load in the last 5 minutes.

CQ2: For each smart plug, count the number of load measurements in the last 5 minutes whose value is higher than the average load in the last 5 minutes.

CQ3: For each smart plug, compare the maximum and average load within the last 5 minutes with the maximum and average load within the last 1 minute.

CQ4: CQ4 is similar to CQ3 but only compares the average load within the two different time windows.

CQ5: For each household, find the maximum total load reported by a single smart plug within the last 5 minutes.

CQ6: For each smart plug, compare the average loads within the last 1, 3, and 5 minutes.

All windows in these queries are time-based sliding windows and slide every 1 second. While CQ2 and CQ4 look similar to CQ1 and CQ3, the aggregate AVGs and aggregate MAXs were exchanged between CQ1 and CQ2 as well as between CQ3 and CQ4. The reason is that windowed AVG can be computed incrementally whereas windowed MAX cannot. Hence, the cost of AVG is normally lower than the cost of MAX in SPEs.

The efficiency of the described optimizer is evaluated first in terms of the optimization time. As noted, the search space size, and thereby the optimization time, is heavily influenced by the number of binary R2R operators in the query. Therefore, in this evaluation, CQ4 is used as a template, and multi-way join queries were constructed which compare the average loads of each smart plug within time windows of variant sizes. For instance, a 5-way join query constructed in this way first calculates the average loads of each smart plug within the last 1, 3, 5, 7, and 9 minutes, and then joins these average loads for each smart plug. For purposes of this evaluation, query decompositions in Phase Two were not applied. For each query, the results illustrate having conducted the optimization 10 times and taking the median of the measured optimization times. The results are summarized in the table 500 of FIG. 5A.

As the results show, with the pruning approach described above, the number of plans to be examined are significantly reduced for the Phase Two optimization. The results also suggest that in the example system, it is reasonable to decompose large logical plans into subplans with 15 operators in Phase-Two. With such decomposition, the logical plan of the 8-way join query produced in Phase-One can be split into two sub-plans, thereby reducing the optimization time from 1 minute to around 2 seconds. The optimization time of Phase Two when the pruning is deactivated is not illustrated, as the results are not meaningful due to the large search space. A list of optimization times for CQ1-CQ6 are provided in table 505 of FIG. 5B.

Figure 6:
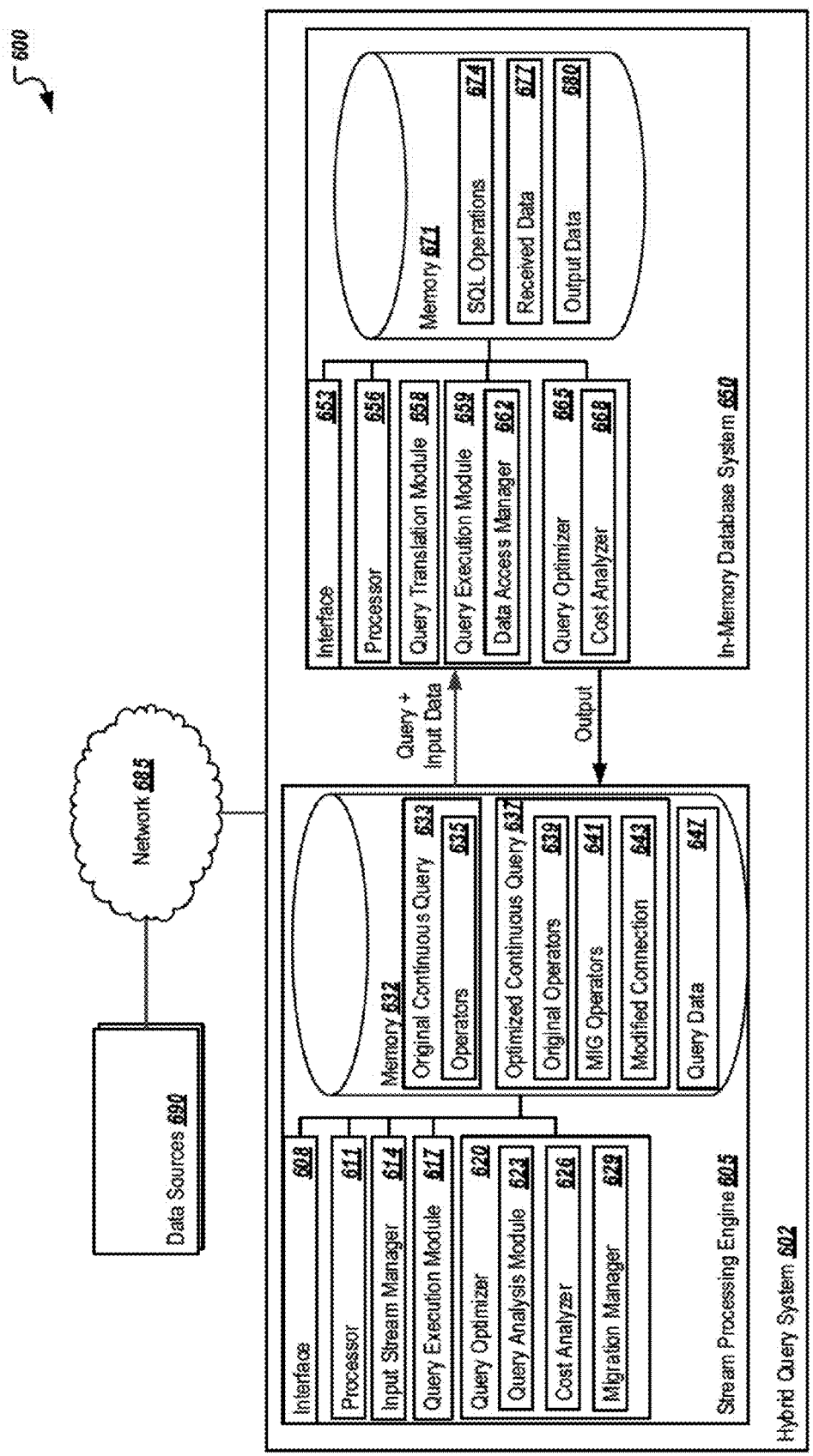
FIG. 6 is a block diagram illustrating an example system for optimizing continuous queries for hybrid execution over a stream processing engine and an in-memory database.

FIG. 6 is a block diagram illustrating an example system 600 for optimizing continuous queries for hybrid execution over a stream processing engine and an in-memory database. As illustrated in FIG. 6, system 600 is a client-server system capable of receiving a data stream of incoming data tuples from one or more data sources 690 at a hybrid query system 602, where a stream processing engine 605 receiving the incoming data tuples from the data sources 690. The system 600 represents an example system for analyzing continuous queries for potential benefits by modifying the continuous query from exclusive execution in the stream processing engine 605 into a combined, or hybrid, execution of the continuous query between the stream processing engine 605 and an in-memory database system 650. Using a hybrid query execution can allow portions of the continuous query to be migrated to the in-memory database system 650 along with the data associated with those execution of such sub-queries to achieve a more efficient data processing.

As illustrated, system 600 includes or is communicably coupled with the hybrid query system 602 (including at least one stream processing engine 605 and at least one in-memory database system 650) and one or more data sources 690, where those systems are connected by network 685. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

In general, the hybrid query system 602 may be any suitable computing server or system for receiving and processing data streams from one or more data sources 690 and executing continuous queries using the input from these data sources 690 through hybrid query execution. The hybrid query system 602, as illustrated, represents a combination of two additional systems, the stream processing engine 605 and the in-memory database system 650. While illustrated inside the hybrid query system 602, the stream processor 605 and the in-memory database system 650 may be separate components, including components logically and/or physically remote from one another. Further, multiple instances of one or both of the stream processing engine 605 and the in-memory database system 650 may be present in alternative implementations.

As used in the present disclosure, the term "computer" is intended to encompass any suitable processing device. For example, the stream processing engine 605 may be any computer or processing device such as, for example, a blade server, general-purpose personal computer (PC), Mac®, workstation, UNIX-based workstation, or any other suitable device. Moreover, although FIG. 6 illustrates stream processing engine 605 as a single system, the stream processing engine 605 can be implemented using two or more systems, as well as computers other than servers, including a server pool. In other words, the present disclosure contemplates computers other than general-purpose computers, as well as computers without conventional operating systems. Further, illustrated stream processing engine 605 may be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the stream processing engine 605 may be any suitable computing server or system for receiving and processing data streams from one or more data sources, and can perform event stream processing operations, such as those designed to assist in event visualization, event databases, event-driven middleware, and event processing languages, among others. The stream processing engine 605 can perform tasks associated with processing streams of event data, such as with the goal of identifying meaningful patterns within those streams, employing techniques such as detection of relationships between multiple events, event correlation, event hierarchies, and other aspects such as causality, membership and timing. In the present illustration, the stream processing engine 605 performs operations associated with receiving tuples from a data stream (associated with the data sources 690) and executing a continuous query based on the input.

As illustrated, stream processing engine 605 includes an interface 608, a processor 611, input stream manager 614, a query execution module 617, a query optimizer 620, and memory 632. In general, the stream processing engine 605 is a simplified representation of one or more systems and/or servers that provide the described functionality, and is not meant to be limiting, but rather an example of the systems possible.

The interface 608 is used by the stream processing engine 605 for communicating with other systems in a distributed environment—including within the environment 600—connected to the network 685, e.g., the in-memory database system 650, the one or more data sources 690, and other systems that are not illustrated, but that are communicably coupled to the network 685. Generally, the interface 608 comprises logic encoded in software and/or hardware in a suitable combination and operable to communicate with the network 685. More specifically, the interface 608 may comprise software supporting one or more communication protocols associated with communications such that the network 685 or interface's hardware is operable to communicate physical signals within and outside of the illustrated environment 600.

Network 685 facilitates wireless or wireline communications between the components of the environment 600 (i.e., between the stream processing engine 605 and data sources 690, between the stream processing engine 605 and the in-memory database system 650, and among others components), as well as with any other local or remote computer, such as additional clients, servers, or other devices communicably coupled to network 685 is depicted as a single network, but may be comprised of more than one network without departing from the scope of this disclosure, so long as at least a portion of the network 685 may facilitate communications between senders and recipients. In some instances, one or more of the illustrated components may be included within network 685 as one or more cloud-based services or operations. The network 685 may be all or a portion of an enterprise or secured network, while in another instance, at least a portion of the network 685 may represent a connection to the Internet. In some instances, a portion of the network 685 may be a virtual private network (VPN). Further, all or a portion of the network 685 can comprise either a wireline or wireless link. Example wireless links may include 802.11ac/ad/af/a/b/g/n, 802.20, WiMax, LTE, and/or any other appropriate wireless link. In other words, the network 685 encompasses any internal or external network, networks, sub-network, or combination thereof operable to facilitate communications between various computing components inside and outside the illustrated environment 600. The network 685 may communicate, for example, Internet Protocol (IP) packets, Frame Relay frames, Asynchronous Transfer Mode (ATM) cells, voice, video, data, and other suitable information between network addresses. The network 685 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 6, the stream processing engine 605 includes a processor 611. Although illustrated as a single processor 611 in FIG. 6, two or more processors may be used according to particular needs, desires, or particular implementations of the environment 600. Each processor 611 may be a central processing unit (CPU), an application-specific integrated circuit (ASIC), a field-programmable gate array (FPGA), or another suitable component. Generally, the processor 611 executes instructions and manipulates data to perform the operations of the stream processing engine 605. Specifically, the processor 611 executes the algorithms and operations described in the illustrated figures, including the operations performing the functionality associated with the stream processing engine 605 generally, as well as the various software modules (e.g., input stream manager 611, query execution module 617, and query optimizer 620), including the functionality for sending communications to and receiving transmissions from data sources 690 and other components.

The input stream manager 614 represents an application, set of applications, software, software modules, or combination of software and hardware used to perform operations related to identifying and processing one or more input streams associated with a particular continuous query and/or operation. Each stream processing engine 605 may be associated with a plurality of continuous queries and incoming data streams. The input stream manager 614 can perform operations to manage different incoming data streams from the plurality of data sources 690 and match those data streams to various continuous queries and operations performed at or managed by the stream processing engine 605. For example, of 100 data sources 690 associated with the stream processing engine 605, 50 may be associated with a first query, 25 with a second query, and 25 with a third query. The input stream manager 614 can perform operations to associate the appropriate input data streams with the corresponding continuous query.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The query execution module 617 receives the data from the data sources 690 and uses that information to execute a particular continuous query 633. The query execution module 617 can be used to execute sliding window aggregate queries, as well as other suitable queries, including any continuous query composed of select, project, join, and aggregate operators. The query execution module 617 may be any software module or component capable of receiving the input data stream and the tuples therein and performing the associated query.

The query optimizer 620 can perform the determination as to (1) an optimal logical plan for a query executed within the stream processing engine 605 itself and, after identifying the optimal plan, (2) determining one or more operators within the continuous query 633 to be executed at the in-memory database system 650 (in the optimized continuous query 637). The query optimizer 620 includes a query analysis module 623, a cost analyzer 626, and a migration manager 629. These and other or alternative components may be used to optimize the continuous query into a hybrid continuous query. It is noted that while illustrated at the stream processing engine 605, the query optimizer 620 or a portion associated with the query optimizer 620 may be included at or a part of the in-memory database system 650, as well as located remotely from or otherwise separate from those systems.

The query analysis module 623 performs an analysis of the continuous query 633 through both operations. Specifically, the operations described in prior figures are performed to identify the optimal path of execution in the stream processing engine 605 alone. Initially, the query analysis module 623 can perform a determination as to whether a feasible optimization plan is possible based on the data arrival rate of the data stream received at the stream processing engine 605. A feasible execution plan, as described herein, is an execution plan that can keep up with the incoming data arrival rate. A feasible query is defined as a query with at least one feasible plan. The optimization plan is based on a feasibility-dependent optimization objective—that is, the feasible plan that has the minimum resource consumption is optimal if the query is a feasible query. If the query is an infeasible query, then the infeasible plan with the maximum throughout is optimal. If no feasible queries are available, then the infeasible plan with the maximum throughput is optimal.

To determine the costs of the operators making up a particular continuous query executed in the stream processing engine 605, a plurality of potential logical queries are defined by the query optimizer 620 and the query analysis module 623, where the plurality of potential logical queries each represent possible permutation of query operators that, when executed, generate the correct result of the continuous query 633. For each potential logical query, the cost analyzer 626 determines a CPU cost of each operator in particular logical queries, and further the CPU cost of entire logical query, to determine a best execution plan within the stream processing engine 605.

The operator cost C(op) of a particular operator is represented as the CPU cost caused by tuples arriving from data sources within a particular unit-time. Previously described calculations for the operator costs can be found above, where the operator cost is $C(op)=\Sigma_{i=1}^{k}(\lambda_i c_i)$, where k represents an operator op with k direct upstream operators, and $\lambda_i$ represents the number of tuples produced by the i-th upstream operator as a result of unit-time source arrivals while $c_i$ represents the time to process a single tuple from the i-th upstream operator. For operator costs in the stream processing engine 605, the costs of the operators are the only consideration as performed by the cost analyzer 626.

Once the optimal logical execution plan for execution in the stream processing engine 605 alone is calculated, the query analysis module 623 and cost analyzer 626 are used to determine whether one or more of the operators in the optimal execution plan should be migrated to the in-memory database system 650 for execution. While cost calculations for the stream processing engine 605 alone include only the costs of performing the operator based on C(op) as described above, cost calculations for execution within the in-memory database 650 include calculations that include data transfers of information to and from the in-memory database system 650 as well as the cost to execute the query associated with the migrated operators.

The process for determining whether one or more of the operators should be migrated to the in-memory database system 650 is performed as a bottom-up plan construction, where the cost of execution of a first operator 635 in the continuous query 633 is calculated and compared to the costs associated with migrating the first operator 635 to the in-memory database system 650. This calculation for each of the operators is considered Phase Two of the optimization solution described herein.

For each operator, among all possible subplans until this operator, where the subplan has a SPE-op as the root, only the optimal subplans are kept. However all subplans until this operator, where the root is a DB-op, are kept during the remaining optimization, as the optimized subplans with a root of DB-op cannot be evaluated until the last operator prior to output is evaluated.

Returning to the illustration of FIG. 3, we assume here that $O_i$ is the first operator, such that the optimizer needs to keep both $I_1$ and $I_2$ even if $I_1$ is cheaper than $I_2$ based on their cost. For the second operator $O_j$, in total 4 subplans should be generated by the optimizer, two of them are $J_1$ and $J_2$ in FIG. 3B, and the other two, say $J_3$ and $J_4$ (not illustrated), have $O_j^{db}$ as the top operator, rather than $O_j^{spe}$. The optimizer compares $J_1$ and $J_2$ and keeps only the cheaper one for the remaining optimization. However, both $J_3$ and $J_4$ are kept by the optimizer, as the final determination has not been made. For the third operator $O_k$, two subplans are generated by extending the cheaper one between $J_1$ and $J_2$; one of them has $O_k^{spe}$ as the top operator, and the other one has or as the top operator. Two subplans are generated by extending $J_3$, and another two subplans are generated by extending $J_4$. So, in total 6 subplans are generated for $O_k$, 3 of which have $O_k^{spe}$ as the top operator and the other 3 have $O_k^{db}$ as the top operator. The optimizer then keeps the cheapest one among the three that have $O_k^{spe}$ as the top operator by comparing their costs, and all the three subplans that have $O_k^{db}$ as the top operator are kept for the remaining part of the optimization. Each operator's SPE-op options can be pruned as the operator is considered. However, the subplans having $O_k^{db}$ as the top operator are maintained until each of the possible subplans for all operators are determined. Then, based on decisions made at the final operator, decisions for the optimal subplan are then calculated.

The query optimizer 620 can use information associated with each of the subplans calculated above, as well as the subplans for the other operators in the continuous query, as well, and determine the optimal execution plan once the full set of subplans are determined. The actual cost of particular operators placed in the database cannot be determined until the placement of both upstream and downstream operators are calculated, as the costs of various operators change based on the need to transfer data between the database and the stream processing engine. In other words, the placement of the next operator, and the prior operator as well, are used to determine the actual cost for the current operator (e.g., what the data transfer cost, if any, to move data from the database to the streaming engine, or vice versa, may be). Therefore, the procedure described continues until the final result operator (i.e., the operator where the final output of the continuous query is output) is reached. At that point, the query optimizer 620 uses the various calculated plans to determine the cheapest plan from the various options, including the actual costs associated with the various database operators. The cheapest plan is determined to be the optimized plan, with that optimal plan being used and all other plans and subplans being discarded.

After the full calculation and when a determination is made to migrate one or more operators 635 (e.g., a series of operators in sequence or a subtree of operators) from the continuous query 633 executed at the stream processing engine 605 to the in-memory database engine 650, the migration manager 629 of the stream processing engine 605 can generate one or more MIG operators 641, where the MIG operators 641 are used as a migration wrapper receiving intermediate query input from the prior operators 639 executed at the stream processing engine 605 and sending query data 647 (e.g., input data, output from any upstream operators, etc.) associated with the migrated operators associated with the MIG operators 641 to the in-memory database system 650. The MIG operators 641 may act as a black box in the stream processing engine's optimized continuous query 637, where the non-moved operators 639 are executed at the stream processing engine 605 and where information received at the location of the MIG operators 641 is transferred to the in-memory database system 650 for execution. As described shortly, the corresponding operations performed at the in-memory database system 650 are then returned to the optimized continuous query 637 as output of the MIG operators 641 after execution at the in-memory database system 650, where the remaining operators 639 executed at the stream processing engine 605 can be performed normally based on that output. In some instances, two or more sequential operators 635, a subtree of operations, or two or more operators 635 where output from one operator is supplied to another, from the original continuous query 633 may be determined for execution at the in-memory database system 650, such that multiple operators 635 can be replaced by a MIG operator 641. Any modified connections 643 between operators based on the determined migrations can be updated in the optimized continuous query 637 such that the execution chain of the optimized continuous query 637 results in the same output of the original continuous query 633 while executing in a hybrid and optimized manner. The migration manager 629 can perform operations associated with sharing input information received at the MIG operators 641 from the upstream operators 639 to the in-memory database system 650 and receiving output information from the execution of the corresponding SQL operations 674 executed at the in-memory database system 650.

While the query optimizer 620 and cost analyzer 626 are described in this example as located at the stream processing engine 605 one or both may be located at the in-memory database system 650 (or any other suitable location), such as at query optimizer 665 and cost analyzer 668. Query analysis module 623 may also be located at the in-memory database system 650 or another suitable location remote from the stream processing engine 605. In some instances, the cost analyzer 668 may perform cost analyses associated with execution at the in-memory database system 650 and the transfer of data to and from the system 650 for execution that portion of the query 637. The cost analysis information can be used to generate query optimizations at the query optimizer 665 or it may be passed to the query optimizer 620 at the stream processing engine 605.

Memory 632 of the stream processing engine 605 may be a single memory 632 or multiple memories 632. Memory 632 may include any memory or database module and may take the form of volatile or non-volatile memory including, without limitation, magnetic media, optical media, random access memory (RAM), read-only memory (ROM), removable media, or any other suitable local or remote memory component. The memory 632 may store various objects or data, including financial and/or business data, user information, behavior and access rules, administrative settings, password information, caches, applications, backup data, repositories storing business and/or dynamic information, and any other appropriate information including any parameters, variables, algorithms, instructions, rules, constraints, or references thereto. Specifically, memory 632 as illustrated includes the original, or non-optimized, continuous query 633, the optimized continuous query 637, and query data 647.

The in-memory database system 650 may be any database management system that primarily relies on main memory for computer data storage and processing. In-memory database systems 650 are faster than disk-optimized databases since the internal optimization algorithms are simpler and execute fewer CPU instructions. Further, accessing data in memory eliminates seek time when querying the data, which provides faster and more predictable performance than disk. In one example, SAP's HANA product, an in-memory, column-oriented, relational database management system developed by SAP SE may be used.

The in-memory database system 650 is illustrated as including an interface 653, processor 656, query execution module 659, query optimizer 665, and memory 671. The interface 653 is used to communicate with other components in the system 600, such as via network 685. In some instances, interface 653 may allow communications directly with the stream processing engine 605, while in other instances, communications may occur over network 685. Interface 653 may be similar to or different than interface 608.

As illustrated, the in-memory database system 650 includes processor 656. Although illustrated as a single processor 656, two or more processors may be used according to particular needs, desires, or particular implementations of the environment 600. Each processor 656 may be a central processing unit (CPU), an application-specific integrated circuit (ASIC), a field-programmable gate array (FPGA), or another suitable component. Generally, the processor 656 executes instructions and manipulates data to perform the operations of the in-memory database system 650. Specifically, the processor 656 executes the algorithms and operations described in the illustrated figures, including the operations to execute one or more queries migrated from the stream processing engine 605, and, in some instances, performing or evaluating potential optimizations and execution costs associated with continuous queries. The processor 656 can provide additional and alternative functionality to the in-memory database system 650, as needed, including the functionality for receiving transmissions from and sending communications to the stream processing engine 605 and other components.

Query translation module 658 can be used to transform operators 635 associated with the MIG operators 641 into queries to be performed at the in-memory database system 650. In the illustrated example, the operators 635 are transformed into SQL operations 674, where the SQL operations 674 are executed by the query execution module 659 at execution time. The query execution module 659 can receive an indication from the stream processing engine 605 to execute the SQL operations 674 associated with the MIG operators 641 and a set of query data 647 shared with the in-memory database system 650, which can be stored as received data 677 within memory 671. The query execution module 659 can execute the appropriate SQL operations 674 associated with the MIG operators 641 by accessing the received data 677 via a data access manager 662 connecting the execution to the appropriate input data. Upon completion of the SQL operations 674 associated with the MIG operators 641, the query execution module 659 can generate a set of output data 680 which may then be returned to the query execution module 617 of the stream processing engine 605 and used as output associated with the execution of the MIG operators 641. That output can then be provided to the next operator in the optimized continuous query 637.

In some instances, multiple sequential operators 635 may be combined into a single MIG operator 641, such that execution of multiple sequential operators 635 from the original continuous query 633 may be combined into a single MIG operator 641 of the optimized continuous query 637 and executed by a corresponding SQL operation 674 at the in-memory database system 650. In those instances, execution of the second and additional sequential operators to be performed at the in-memory database system 650 may not incur the same data transfer cost as operators initially being moved to the in-memory database system 650.

Memory 671 may be any memory or storage associated with the in-memory database system 650, and can be similar to or different from memory 632. Memory 671 can be optimized for use in the in-memory database system 650, and may represent volatile memory. In some instances, at least a part of memory 671 may also include non-volatile memory, where appropriate. Memory 671 can store queries, stored procedures, data, tables, and other in-memory database-related information. As illustrated, memory 671 includes the translated SQL operations 674, received data 677 associated with execution of particular SQL operations 674, and output data 680 from the executed SQL operations 674.

Data sources 690 include any suitable data sources feeding tuples and data into one or more continuous queries managed by the stream processing engine 605 and/or other suitable components. For example, the data sources 690 may be associated with any input source against which data is queried, including using sliding window aggregate queries. The data sources 690 may be sensors in a sensor network, financial information, real-time results from current events or actions, or any other suitable sources of data relevant to the queries executed at the stream processing engine 605. The incoming data may be raw data provided by various systems, or may be processed data based on raw data captured or received at the data sources 690. In the context of the described systems and tools, the data generated by the data sources 690 may be considered based on a relational data model.

While portions of the elements illustrated in FIG. 6 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 7:
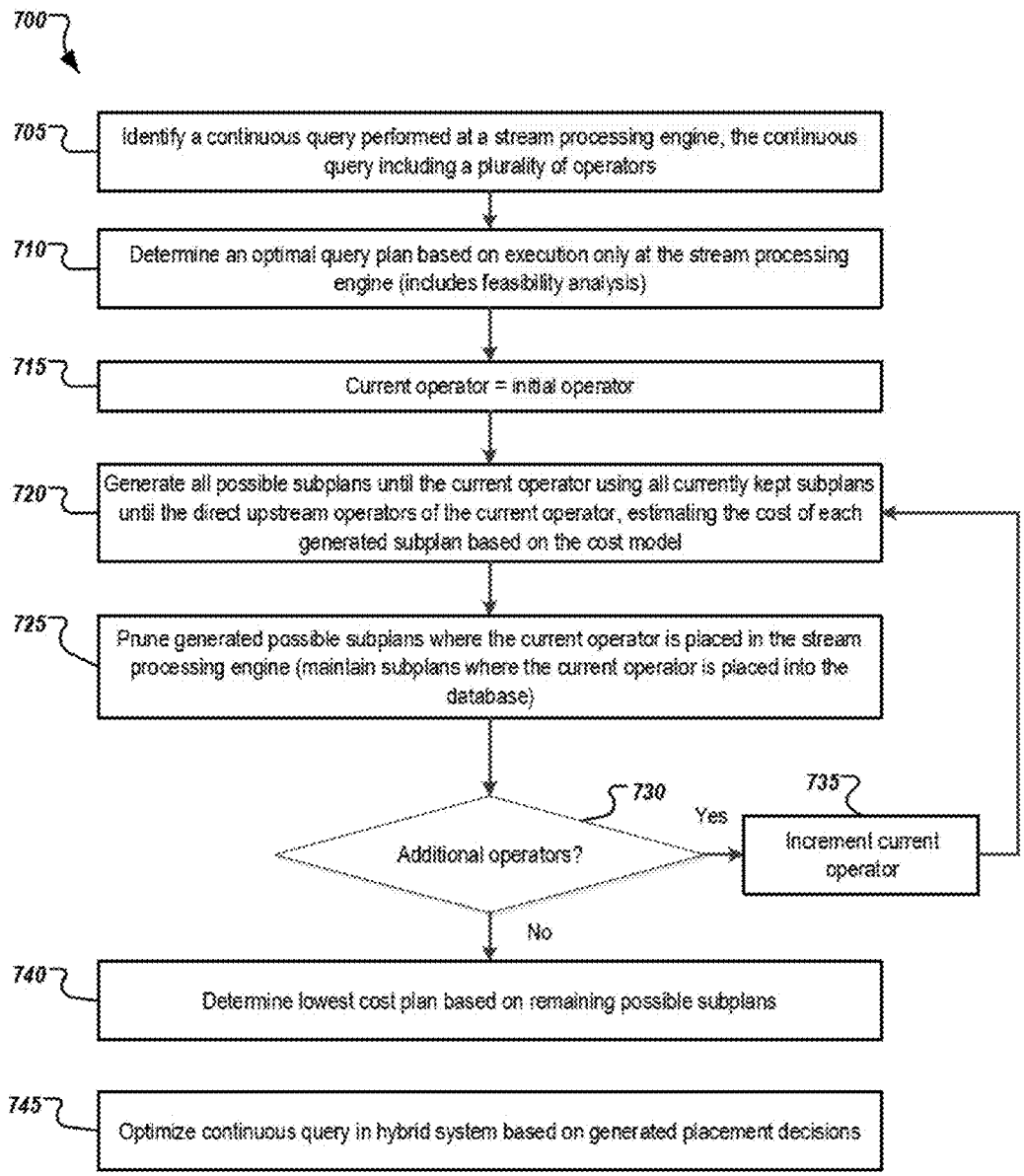
FIG. 7 is an illustration of example operations for optimizing continuous queries for hybrid execution over a stream processing engine and an in-memory database.

FIG. 7 is an illustration of example operations 700 performed to optimize continuous queries for hybrid execution over a stream processing engine and an in-memory database. For clarity of presentation, the description that follows generally describes method 700 in the context of the system 600 illustrated in FIG. 6. However, it will be understood that method 700 may be performed, for example, by any other suitable system, environment, software, and hardware, or a combination of systems, environments, software, and hardware as appropriate. In the described method 700, the operations may be performed at a stream processing engine or other suitable location.

At 705, a continuous query is identified that is to be performed at a stream processing engine. The continuous query may include a plurality of operators in its logical execution.

At 710, an optimal query plan for execution only at the stream processing engine is determined. In some instances, the optimal query plan is determined based on a feasibility analysis of a plurality of potential execution plans. As discussed above, a particular execution plan is feasible where it can keep up with a data arrival rate of tuple inputs associated with the continuous query. Feasible queries are those where at least one feasible plan is available. Infeasible queries are those queries where no feasible plans are available. A feasibility-dependent optimization objective can be determined based on whether the query is feasible or not. Where the query is feasible, the feasible plan using the minimum resource consumption is deemed optimal. When the query is not feasible, the infeasible plan with the maximum throughput is selected as the optimal plan. Details regarding determining the optimal plan are discussed above.

Once the optimal plan for execution at the stream processing engine alone is determined, method 700 continues at 715. At 715, in preparation for the hybrid query optimization analysis, an initial operator in the continuous query is set as the current operator. The initial operator may be considered the first operator at which the input data is received and processed.

At 720, all possible subplans until the current operator are generated, where the generation uses all currently kept subplans until the direct upstream operators of the current operator. Further, the costs of the possible subplans are generated based on an analyzed cost model. The operation at 720 is only responsible for determining an intermediate cost and analysis, as a decision regarding the final placement of the operator cannot be made at this moment, as the final placement decisions of each operator may be based upon the placement decisions of one or more other operators (e.g., the need for potential transfers of data between the SPE and the database are not known until the analysis of all operators is complete, as the decision for the final operator providing the output of the query will then affect all upstream decisions. Therefore, the hybrid execution system, as described above, is a combination of a stream processing engine and an in-memory database system, where a portion of a continuous query executed in a stream processing engine is outsourced to an (e.g., in-memory) database system, where the portion outsourced to the database system is determined to be performed quicker or more efficiently at the in-memory database system. To make the intermediate decisions, the relative costs associated with the execution of the operator at the stream processing engine and the costs of migrating the execution of the operator to the in-memory database system are compared. In some instances, the migration costs may be minimized or absent where the previous and/or next operators are also to be executed at the database system. Because the final placement decision relies on the other placements, any calculations performed at 720 are intermediate in nature, and are not final decisions. The relatively lower cost action will be selected as the placement decision for the current operator after all of the operators have been considered, and where upstream decisions on operator placement are made and the effects on potential placements at the current operator can be determined. Potential costs associated with migrating the execution of the operator to the in-memory database system include the costs associated with the execution of the operator as well as the costs to transfer the corresponding input data to the in-memory database system and to perform a return transfer of the corresponding output data from the execution of the operator executed at the in-memory database system back to the stream processing engine. In instances where a prior operator is determined to be executed at the in-memory database system, at least some input data may not need to be transferred from the stream processing engine to the in-memory database system, as the execution of the prior operator at the in-memory database system may provide the necessary input. In those situations, the lack of need for transfer of data may be considered in the cost analysis.

At 725, potential hybrid subplans where the current operator is placed in the stream processing engine can be pruned, where only the lowest cost or cheapest subplan where the current operator is placed in the stream processing engine is retained for consideration. All other subplans where the current operator is placed in the database are kept. All of the kept subplans are then used to generate possible subplans for the next operator, if any. As previously noted, no final placement decision is made for intermediate operators. Instead, the optimizer keeps many plans during optimization. Only at the last operator will the optimizer compare the costs of all kept plans and choose the cheapest or lowest cost plan as the final execution plan of the query. Only at that point in time can the final placement decision for each operator be known.

At 730, a determination is made as to whether additional operators are included in the continuous query. If more operators are to be analyzed, method 700 continues at 730 where the current operator is incremented to the next operator in the continuous query at 735, and method 700 continues back to 720 to perform the intermediate analysis for the next operator. If, however, no additional operators are left, method 700 continues to 740 where the lowest cost plan from the remaining (i.e., non-pruned) possible subplans is determined. At 745, the continuous query is optimized in the hybrid system based on the determination of the lowest cost plan and its placement decisions. An example set of operations for performing the optimization are detailed in FIG. 8A.

Figure 8A:
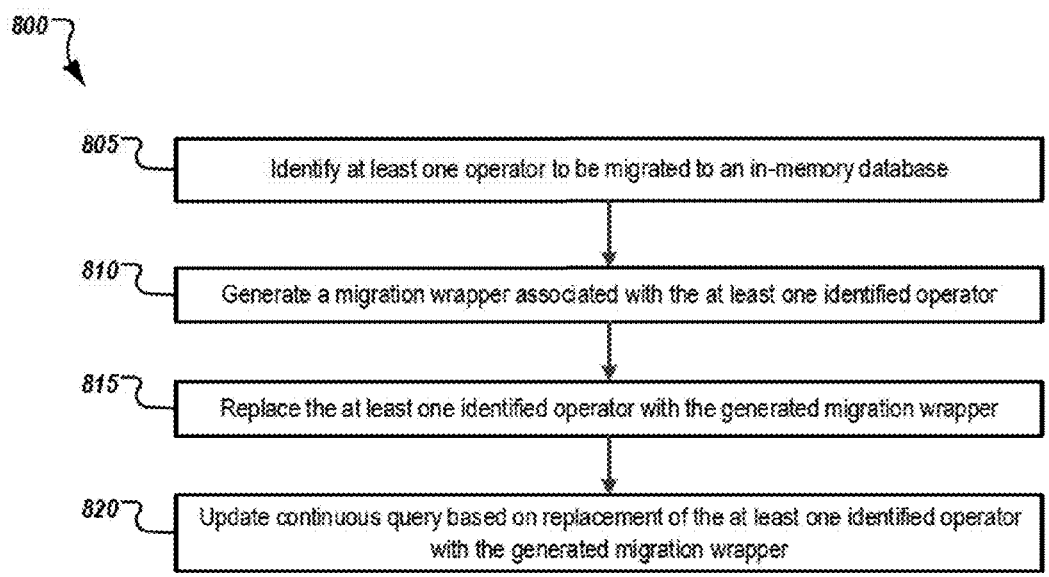
FIG. 8A is an illustration of example operations for migrating one or more operators in a continuous query from a stream processing engine to an in-memory database.

FIG. 8A is an illustration of example operations 800 performed in migrating one or more operators in a continuous query to an in-memory database. Method 800 can be performed for each operator to be moved to the in-memory database system when generating the optimized continuous query in the hybrid system based on the generated placement decisions. For clarity of presentation, the description that follows generally describes method 800 in the context of the system 600 and method 700 illustrated in FIGS. 6 and 7, respectively. However, it will be understood that method 800 may be performed, for example, by any other suitable system, environment, software, and hardware, or a combination of systems, environments, software, and hardware as appropriate. In the described method 800, the operations may be performed at a stream processing engine or other suitable location.

At 805, at least one operator to be migrated to an in-memory database system is identified. The operators to be migrated for a particular MIG operator (as described in FIG. 6) may be a series of sequential operators, where the operators are to be executed together at the in-memory database system. The illustration of FIG. 8A assumes that at least one operator is determined to be migrated to the database after the optimization determinations. However, in some instances, a determination may be made that none of the operators will be migrated, such that the operations of FIGS. 8A and 8B are unnecessary because all operators are processed in the stream processing engine.

A migration wrapper associated with the at least one identified operator can be generated at 810, where that migration wrapper replaces the at least one identified operator in the optimized continuous query at 815. As described above, the migration wrapper may be a MIG operator that is used to connect the portions of the continuous query executing in the stream processing engine to the operators migrated to the in-memory database system. FIG. 8B describes the operations associated with execution of the migration wrapper at query execution time.

At 820, the continuous query is updated based on the replacement of the at least one identified operator with the generated migration wrapper. The update may include revising connections from the upstream operators to the replaced operators with connections from the upstream operators to the migration wrapper, as well as similar changes for connections to the downstream operators. Similar operations as those described in FIG. 8A may be performed for each and every operator or set of operators to be migrated to the in-memory database system. The optimization can be performed prior to query execution and after the determinations as to the query optimization are complete. The result of completing FIG. 8A for each of the operators to be migrated is an updated and optimized continuous query that is optimized across the hybrid query system as described herein.

Figure 8B:
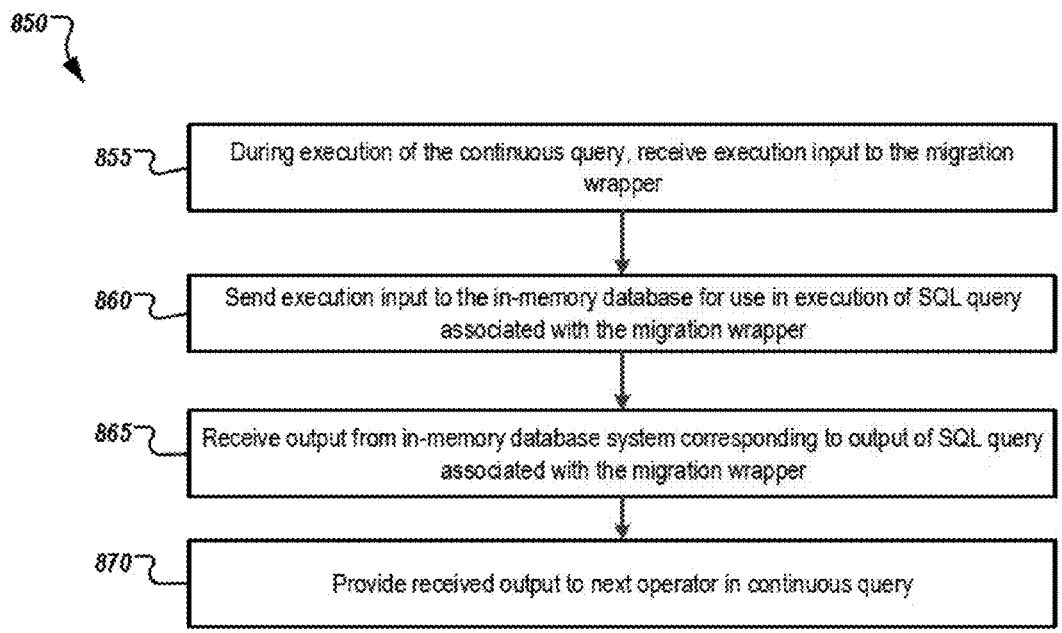
FIG. 8B is an illustration of example operations for executing a continuous query when query execution reaches a migration wrapper included in an optimized continuous query where one or more operators have been migrated to the in-memory database system.

FIG. 8B is an illustration of example operations 850 for executing a continuous query when query execution reaches a migration wrapper included in an optimized continuous query where one or more operators have been migrated to the in-memory database system. For clarity of presentation, the description that follows generally describes method 800 in the context of the system 600, method 700, and method 800 illustrated in FIGS. 6, 7, and 8A, respectively. However, it will be understood that method 850 may be performed, for example, by any other suitable system, environment, software, and hardware, or a combination of systems, environments, software, and hardware as appropriate. In the described method 850, the operations may be performed at a stream processing engine or other suitable location.

At 855, execution input associated with the continuous query being executed at the stream processing engine is received as input to the migration wrapper during execution of the continuous query. In other words, the optimized query generated in FIGS. 7 and 8B is being executed in the illustrated method 850, where one or more operators have been migrated to the in-memory database system for execution, and where those operators have been replaced with one or more migration wrappers (e.g., MIG operators) in the stream processing engine. As noted, the migration wrapper can act as a black box in the optimized continuous query, where input is received at the migration wrapper (to be input to the migrated operators). Method 850 describes how a single instance of a migration wrapper is handled at execution time, and may be performed multiple times during execution of a particular continuous query based on various sets of operators being migrated to the in-memory database when the identified optimizations are implemented.

At 860, the execution input received at the migration wrapper is sent or transferred to the in-memory database for use in execution of the SQL query corresponding to and associated with the migration wrapper. The execution input may be sent directly to a query execution manager at the in-memory database system, or to another location upon which the SQL query at the in-memory database system can access said data. In some instances, the transfer of data may include an indication or instruction to perform the SQL query based on the transferred data.

At 865, output from the in-memory database system corresponding to the output of the SQL query associated with the migration wrapper is received. The output of the SQL query may need to be formatted or translated into a format of the stream processing engine in some instances. In others, the output may be identical to the output that would have been generated by the previously-replaced operators from the original continuous query.

At 870, the received output is provided to the next downstream operator in the continuous query. The received output provided to the downstream operators is identical to the output that would have been generated by the original operators, such that the downstream operators are not notified or otherwise concerned with the migration of the prior operators to the in-memory database system.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/ or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method for query optimization performed by one or more processors, the method comprising:
    identifying a continuous query executed at a stream processing engine, the continuous query including a plurality of operators;
    determining an optimal plan for execution of the identified continuous query at the stream processing engine;
    for each of the plurality of operators in the determined optimal plan, determining an optimized placement decision for executing a particular operator in the stream processing engine or at a database system;
    generating an optimized continuous query from the identified continuous query based on the determined optimal placement decisions for each of the plurality of operators in the determined optimal plan, wherein generating the optimized continuous query from the identified continuous query based on the determined optimal placement decisions for each of the plurality of operators in the determined optimal plan comprises:
        generating a migration wrapper associated with a subtree of operators determined to be migrated to the database system; and
        replacing the subtree of operators with the generated migration wrapper in the optimized continuous query at the stream processing engine; and
    executing the generated optimized continuous query at the stream processing engine and the database system.

2. The method of claim 1, wherein the determined optimal placement decisions for at least a subset of the plurality of operators is for execution at the database system, wherein the optimized continuous query includes migrating the subset of the plurality of operations to the database system for execution.

3. The method of claim 1, wherein the optimized placement decision for each of the plurality of operators in the determined optimal plan is to execute in the stream processing engine.

4. The method of claim 1, wherein determining the optimized placement decision for executing a particular operator includes:
for each particular operator:
generating at least two potential optimal plans based on execution of the particular operator at the stream processing engine and on execution of the particular operator at the database system;
determining a first operator cost for the particular operator to be executed at the stream processing engine;
determining a second operator cost for the particular operator to be executed at the database system; and
determining the optimized placement decision for the particular operator based on a comparison between the at least two potential optimal plans based at least in part the first operator cost and the second operator cost.

5. The method of claim 4, wherein the second operator cost represents an aggregation of the determined costs for executing the particular operator at the database system, an estimated cost associated with transferring input data from the stream processing engine to the database system, and an estimated cost associated with transferring output data generated by the execution of the particular operator at the database system to the stream processing engine.

6. The method of claim 1, wherein the subtree of operators represents a series of operators determined to be migrated to the database system.

7. The method of claim 1, wherein the subtree of operators includes a single operator.

8. The method of claim 1, wherein the generated migration wrapper comprises a migration operator, wherein the migration operator replaces the particular subtree of operators.

9. The method of claim 8, wherein the migration operator, during execution of the optimized continuous query:
receives an input associated with the particular operator that the migration operator replaced;
transfers the received input to the database system for execution with a corresponding query executed at the database system; and
receives an output generated by the execution of the corresponding query at the database system.

10. The method of claim 8, further comprising:
in response to generating the migration wrapper associated with a particular operator determined to be migrated to the database system, generating a structured query language (SQL) query corresponding to the particular operator for execution at the database system; and
wherein replacing the particular operator with the generated migration wrapper in the optimized continuous query at the stream processing engine includes linking the generated migration wrapper to the generated SQL query at the database system.

11. The method of claim 1, wherein determining the optimal plan for execution of the identified continuous query at the stream processing engine comprises performing a feasibility analysis of a plurality of potential execution plans for the identified continuous query at the stream processing engine.

12. The method of claim 1, wherein generating the optimized continuous query from the identified continuous query based on the determined optimal placement decisions comprises migrating a subset or a whole set of operators from the stream processing engine to the database system.

13. A non-transitory, computer-readable medium storing computer-readable instructions executable by a computer and configured to:
identify a continuous query executed at a stream processing engine, the continuous query including a plurality of operators;
determine an optimal plan for execution of the identified continuous query at the stream processing engine;
for each of the plurality of operators in the determined optimal plan, determine an optimized placement decision for executing a particular operator in the stream processing engine or at a database system;
generate an optimized continuous query from the identified continuous query based on the determined optimal placement decisions for each of the plurality of operators in the determined optimal plan, wherein generating the optimized continuous query from the identified continuous query based on the determined optimal placement decisions for each of the plurality of operators in the determined optimal plan comprises:
generating a migration wrapper associated with a subtree of operators determined to be migrated to the database system; and
replacing the subtree of operators with the generated migration wrapper in the optimized continuous query at the stream processing engine; and
execute the generated optimized continuous query at the stream processing engine and the database system.

14. The medium of claim 13, wherein the determined optimal placement decisions for at least a subset of the plurality of operators is for execution at the database system, wherein the optimized continuous query includes migrating the subset of the plurality of operations to the database system for execution.

15. The medium of claim 13, wherein the optimized placement decision for each of the plurality of operators in the determined optimal plan is to execute in the stream processing engine.

16. The medium of claim 13, wherein determining the optimized placement decision for executing a particular operator includes:
for each particular operator:
generating at least two potential optimal plans based on execution of the particular operator at the stream processing engine and on execution of the particular operator at the database system;
determining a first operator cost for the particular operator to be executed at the stream processing engine;
determining a second operator cost for the particular operator to be executed at the database system; and
determining the optimized placement decision for the particular operator based on a comparison between the at least two potential optimal plans based at least in part the first operator cost and the second operator cost.

17. The medium of claim 16, wherein the second operator cost represents an aggregation of the determined costs for executing the particular operator at the database system, an estimated cost associated with transferring input data from the stream processing engine to the database system, and an estimated cost associated with transferring output data generated by the execution of the particular operator at the database system to the stream processing engine.

18. The medium of claim 13, wherein the generated migration wrapper comprises a migration operator, wherein the migration operator replaces the particular subtree of operators.

19. A system, comprising:
a memory;
at least one hardware processor interoperably coupled with the memory and configured to:
identify a continuous query executed at a stream processing engine, the continuous query including a plurality of operators;
determine an optimal plan for execution of the identified continuous query at the stream processing engine;
for each of the plurality of operators in the determined optimal plan, determine an optimized placement decision for executing a particular operator in the stream processing engine or at a database system;
generate an optimized continuous query from the identified continuous query based on the determined optimal placement decisions for each of the plurality of operators in the determined optimal plan, wherein generating the optimized continuous query from the identified continuous query based on the determined optimal placement decisions for each of the plurality of operators in the determined optimal plan comprises:
generating a migration wrapper associated with a subtree of operators determined to be migrated to the database system; and
replacing the subtree of operators with the generated migration wrapper in the optimized continuous query at the stream processing engine; and
execute the generated optimized continuous query at the stream processing engine and the database system.

* * * * *